US008429366B2

(12) United States Patent
Kawano et al.

(10) Patent No.: US 8,429,366 B2
(45) Date of Patent: Apr. 23, 2013

(54) DEVICE AND METHOD FOR MEMORY CONTROL AND STORAGE DEVICE

(75) Inventors: Shinji Kawano, Yokohama (JP); Kazuo Ishikawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1077 days.

(21) Appl. No.: 12/108,985

(22) Filed: Apr. 24, 2008

(65) Prior Publication Data
US 2008/0270734 A1   Oct. 30, 2008

(30) Foreign Application Priority Data

Apr. 25, 2007   (JP) .................. 2007-116153

(51) Int. Cl.
*G06F 12/00*   (2006.01)
*G06F 13/00*   (2006.01)
*G06F 13/28*   (2006.01)

(52) U.S. Cl.
USPC ........................... 711/165; 711/103; 711/170

(58) Field of Classification Search .................. 711/170, 711/103, 165
See application file for complete search history.

(56) References Cited

U.S. PATENT DOCUMENTS

| | | | | |
|---|---|---|---|---|
| 5,867,641 A | * | 2/1999 | Jenett | 714/6.32 |
| 6,621,746 B1 | * | 9/2003 | Aasheim et al. | 365/185.29 |
| 7,315,917 B2 | * | 1/2008 | Bennett et al. | 711/103 |

FOREIGN PATENT DOCUMENTS

| | | |
|---|---|---|
| JP | 6-119252 | 4/1994 |
| JP | 2007-58840 | 3/2007 |
| JP | 2008-9636 | 1/2008 |

* cited by examiner

*Primary Examiner* — Stephen Elmore
*Assistant Examiner* — Mark Giardino, Jr.
(74) *Attorney, Agent, or Firm* — Oblon, Spivak, McClelland, Maier & Neustadt, L.L.P.

(57) ABSTRACT

A memory control device according to an example of the invention comprises an allocation section allocating a plurality of memory regions of a memory module, an available space storage section storing data in available space of a first memory region that is one of the plurality of memory regions and, when no more space becomes available in the first memory region, store data in available space of a following second memory region, and a copying section copying a plurality of items of to-be-copied data that is stored in the first memory region but not in the second memory region to the second memory region after no more space becomes available in the first memory region in such a manner that a copying operation is divided into a plurality of times.

14 Claims, 5 Drawing Sheets

DEVICE AND METHOD FOR MEMORY CONTROL AND STORAGE DEVICE

CROSS-REFERENCE TO RELATED APPLICATIONS

This application is based upon and claims the benefit of priority from prior Japanese Patent Application No. 2007-116153, filed Apr. 25, 2007, the entire contents of which are incorporated herein by reference.

BACKGROUND OF THE INVENTION

1. Field of the Invention

The present invention relates to a memory control device and method for controlling a process of storing data in a memory (memory module), and a storage device using the device and method.

2. Description of the Related Art

A conventional storage device using a semiconductor memory requires management data such as an address conversion table in order to convert a logical address to a physical address.

The controller of such a conventional semiconductor memory stores the management data to a storage section of the controller and updates the data in accordance with a command from the host.

When the management data is updated in the storage section of the controller, the controller executes a writeback process in which the updated portion of the management data is written in the management region of the semiconductor memory page by page, which is the minimum writable unit.

If there is no space available in the management region of the semiconductor memory, the controller creates a new management region and stores the latest state of the management data page by page in the new management region.

An information processing device according to Patent Document 1 (Jpn. Pat. Appln. KOKAI Publication No. 6-119252) constitutes regions by using a block or several blocks as a unit. A block is an erasable unit of a non-volatile memory device. The information processing device according to Patent Document 1 erases and writes data for each region. This information processing device assigns one of the regions in the non-volatile memory device as a management information region to store the management information of the data stored in the non-volatile memory device. Each region comprises a memory areas that indicates whether it is the management information region. The management information includes a memory portion for storing the number of writings in each of the regions.

When a new management region is created, the controller of the conventional semiconductor memory stores (copies) the latest state of all the pages stored in the fully occupied management region entirely to the new management region.

For this reason, each time when a new management region is created, a certain amount of processing time is required to copy the latest state of the pages from the fully occupied management region to the new management region. This processing time increases in accordance with the number of pages.

BRIEF SUMMARY OF THE INVENTION

A memory control device according to an example of the invention comprises an allocation section allocating a plurality of memory regions of a memory module, an available space storage section storing data in available space of a first memory region that is one of the plurality of memory regions and, when no more space becomes available in the first memory region, store data in available space of a following second memory region, and a copying section copying a plurality of items of to-be-copied data that is stored in the first memory region but not in the second memory region to the second memory region after no more space becomes available in the first memory region in such a manner that a copying operation is divided into a plurality of times.

DETAILED DESCRIPTION OF THE INVENTION

Embodiments of the present invention will be explained below with reference to the drawings. A memory control device (controller) according to an embodiment stores data, when one memory region (first memory region) of allocated memory regions has no more available space, in the next memory region (second memory region).

Moreover, the memory control device according to the embodiment stores, when there is more than one item of to-be-copied data that is stored in one of the memory regions but not in the following memory region, the items of the to-be-copied data into the second memory region, where the copy operation is divided into a number of times.

The memory control device according to the embodiment shortens the execution time for one cycle of the process of copying data from a fully-occupied memory region to a new memory region when the new memory region is allocated in the memory.

In the embodiments, an operation performed when the management data (control data) is updated will be explained. However, the same method can be applied to control for data other than management data.

Figure 1:
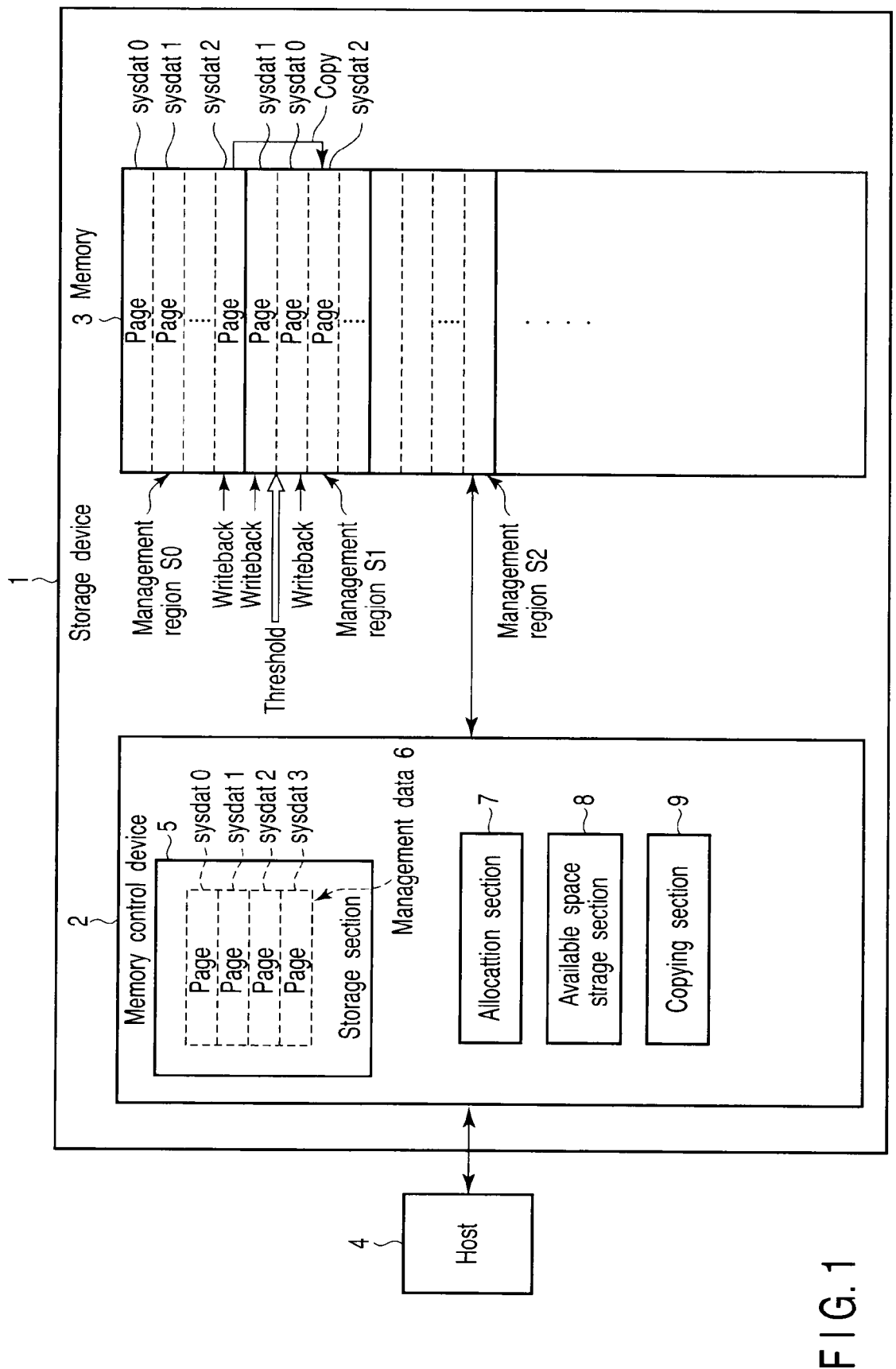
FIG. 1 is a block diagram of an example structure of a memory control device according to an embodiment.

FIG. 1 is a block diagram of an example structure of the memory control device according to an embodiment.

A storage device 1 comprises a memory control device 2 and a memory (memory module) 3. The storage device 1 may be a memory card, but is not limited thereto. As an example of the memory 3, a semiconductor memory such as a NAND flash memory may be adopted, but the memory 3 is not limited thereto.

A host 4 reads data from the storage device 1 and writes data in the storage device 1.

The memory control device 2 comprises a storage section 5 such as a random access memory (RAM). The storage section 5 stores management data 6 that includes data for converting logical addresses to physical addresses.

In a data reading operation, the memory control device 2 receives a read command and a logical address from the host 4, converts the logical address to a physical address by use of the management data 6 in the storage section 5, reads data from the memory 3 at a position indicated by the physical address, and sends the read out data back to the host 4.

In a data writing operation, the memory control device 2 receives a write command, data and a logical address from the host 4, converts the logical address to a physical address by use of the management data 6 in the storage section 5, and writes the data into the memory 3 at a position indicated by the physical address.

The memory control device 2 divides the management data 6 into different pages sysdat0 through sysdat3. The states of the pages sysdat0 to sysdat3 are stored in the management region allocated in the memory 3. Furthermore, when the content of one of the pages of the management data 6 is updated in the storage section 5 of the memory control device 2, the content of the updated page is stored into available space of the management region of the memory 3. The operation of storing an updated page of the memory control device 2 in the memory 3 is referred to as writeback.

The memory control device 2 comprises an allocation section 7, an available space storing section 8, and a copying section 9.

The allocation section 7 allocates management regions S0 and S1 in the memory 3. The management region S1 (second management region) is put into use after the management region S0 (first management region).

When all the to-be-copied data that is stored in the management region S0 has finished being stored in the management region S1, the allocation section 7 releases (disuses) the management region S0 and allocates a new management region S2. Thereafter, the allocation section 7 repeats releasing of management regions and allocating of new management regions.

According to the present embodiment, the to-be-copied data indicates any pages in their latest state that are stored in the fully occupied management region but not in the management region in which the writeback operation is being carried out.

When a page of the management data 6 in the storage section 5 is updated, the available space storing section 8 writes the updated page in any available space of the management region S0 that is determined from the management regions S0 and S1 as a writeback destination. When there is no more available space in the management region S0, the available space storing section 8 writes the updated page in any available space of the next management region S1. Thereafter, the available space storing section 8 repeats the writeback operation onto a management region that has any available space every time of page updating.

When there is no space available in the writeback destination management region S0 and the number of pages stored in the management region S1 that is a new writeback destination exceeds a threshold value predetermined to be 1 or larger, the copying section 9 stores (copies) the pages in the latest state (to-be-copied data) that are stored in the fully occupied management region S0 but not in the new writeback destination management region S1, into any available space of the management region S1. It should be noted here that the copying operation is divided into a number of times according to occurrences of the writeback process. Each time any updated pages are written in the writeback destination management region S1, the copying section 9 stores at least one item of the to-be-copied data in the management region S1. The copying section 9 repeats the same copying process onto the next writeback destination management region when the management region that has been used has no more available space.

Figure 2:
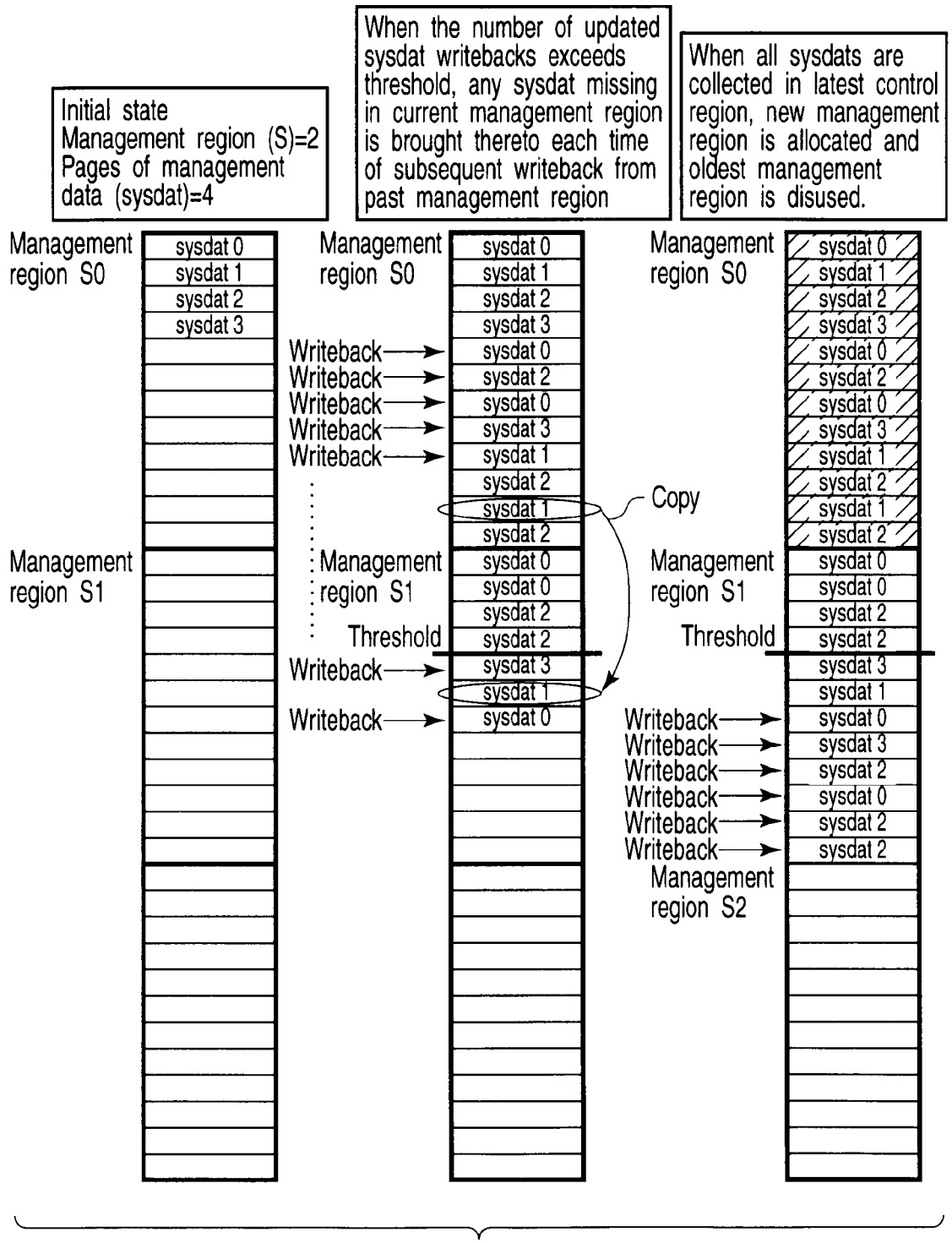
FIG. 2 is a diagram showing an example of control executed by the memory control device according to the present embodiment.

FIG. 2 is a diagram showing an example of control executed by the memory control device 2 according to the present embodiment. In this diagram, two management regions are allocated at a time by the allocation section 7, and the management data 6 contains four pages. Twelve pages can be stored in one management region at most. The number of management regions allocated by the allocation section 7 may be three or more, and the number of pages contained in the management data 6 can be two or larger. The maximum number of pages stored in one management region may be equal to or larger than the number of pages in the management data 6.

The allocation section 7 of the memory control device 2 allocates the management region S0. The available space storing section 8 of the memory control device 2 thereby stores the pages sysdat0 to sysdat3 which constitute the management data 6 stored in the storage section 5 of the memory control device 2, into the management region S0.

When the management data 6 of the storage section 5 is updated in the memory control device 2, the available space storing section 8 writes the updated page into the available space of the management region S0.

Before or when the management region S0 has no more available space, the allocation section 7 allocates the management region S1 to be used next.

When all the available space in the management region S0 is used up by the writeback operation, the available space storing section 8 shifts the writeback operation to the management region S1.

When no more space becomes available in the writeback destination management region S0 and the number of pages written in the new writeback destination management region S1 exceeds a threshold value (set to 4 in the example) but not all the pages are stored in the management region S1, the copying section 9 copies the latest state of at least one of the pages that are not yet stored in management region S1, into the management region S1 each time of page writeback to the management region S1. FIG. 2 indicates, for the sake of simplicity, only one page that is not stored in the management region S1 (page that is to be copied from the management region S0 to the management region S1). However, when there are two pages or more that are not stored in the management region S1, the copying operation from the management region S0 to the management region S1 is divided into a number of times according to occurrences of the writeback process.

When all the pages in their latest state are collected in the writeback destination management region S1, the allocation section 7 releases (or disuses) the management region S0 that has no available space, and allocates a new management region S2. The management region S2 may be allocated when no space becomes available in the management region S1 or before such a situation occurs.

When there is no more space available in the management region S1, the same process is carried out onto this fully occupied management region S1 and the new writeback destination management region S2.

Figure 3:
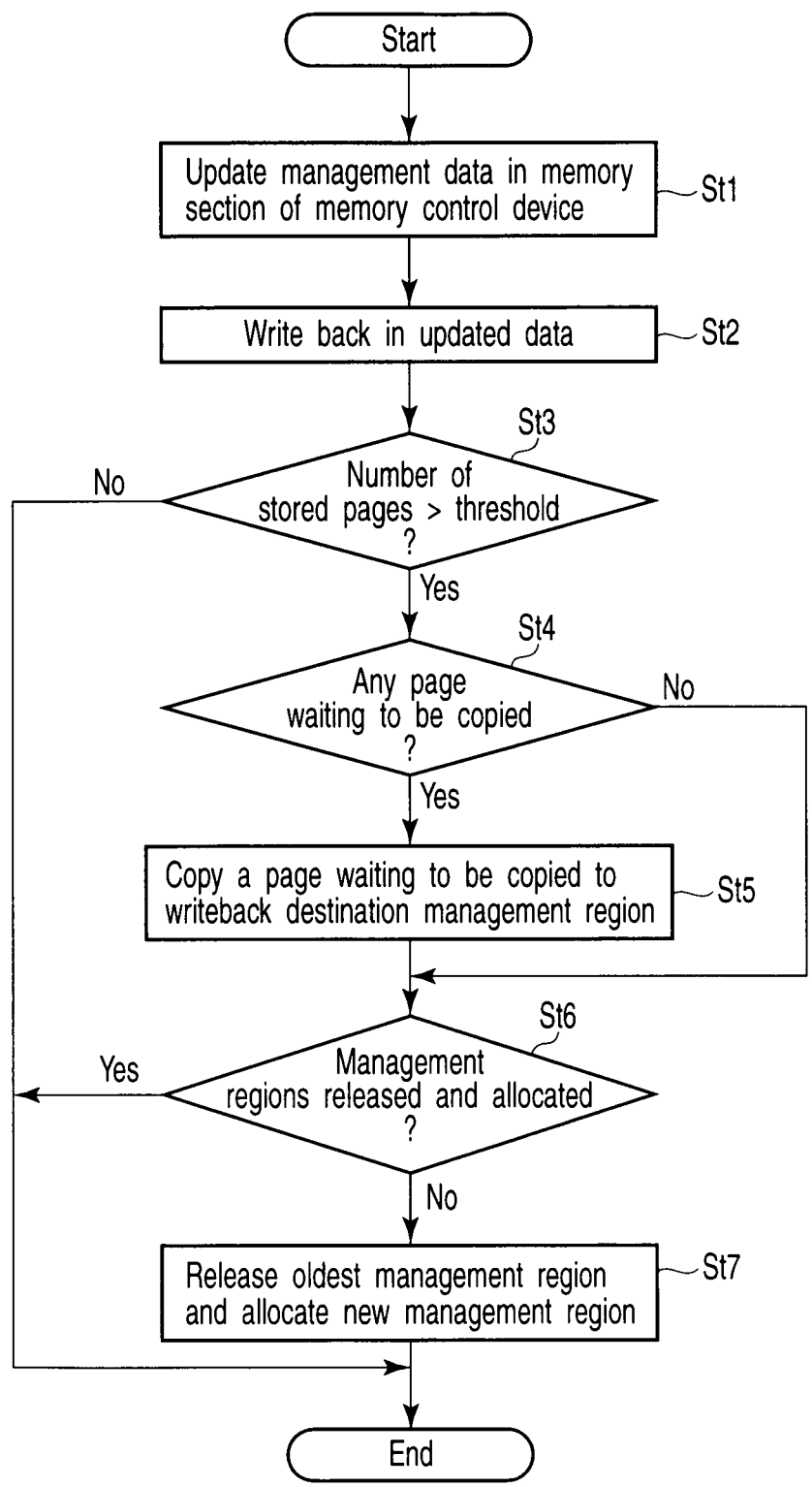
FIG. 3 is a flowchart for showing an example of the process conducted by the memory control device after management data in the storage section of the memory control device 2 is updated.

FIG. 3 is a flowchart for showing an example of the process conducted by the memory control device 2 after the management data 6 in the storage section 5 of the memory control device 2 is updated.

In step St1, the memory control device 2 updates the management data 6 stored in the storage section 5.

In step St2, the available space storing section 8 of the memory control device 2 writes an updated page of the management data 6 into available space of the writeback destination management region.

In step St3, the copying section 9 of the memory control device 2 determines whether the number of pages stored in the writeback destination management region exceeds a threshold value. When the number of pages stored in the writeback destination management region does not exceed the threshold value, the process is terminated.

When the number of pages stored in the writeback destination management region exceeds the threshold value, the copying section 9 of the memory control device 2 determines in step St4 whether there is any page (to-be-copied data) not stored in the current writeback destination management region but stored in the previous writeback destination management region, or in other words whether there is any page that is to be copied.

When there is no more page that is to be copied (in other words, when all the pages are collected in the current writeback destination management region), the process moves onto step St6.

When there is any page that is to be copied, the copying section 9 of the memory control device 2 copies any number of items of the to-be-copied data into the current writeback destination management region in step St5 in such a manner that the copying operation is divided into a number of times.

In step St6, the allocation section 7 of the memory control device 2 determines whether the previous writeback destination management region has been released and also whether a new management region has been allocated, during the writeback process onto the current writeback destination management region. If the previous writeback destination management region has been released and a new management region has been allocated during the writeback process onto the current writeback destination management region, the process is terminated.

If the previous writeback destination management region has not been released and a new management region has not been allocated during the writeback process onto the current writeback destination management region, the allocation section 7 of the memory control device 2 releases the previous writeback destination management region and allocates a new management region in step St7. Then, the process is terminated.

Advantages of the memory control device 2 according to the present embodiment will be explained below, in comparison with a conventional controller.

Figure 4:
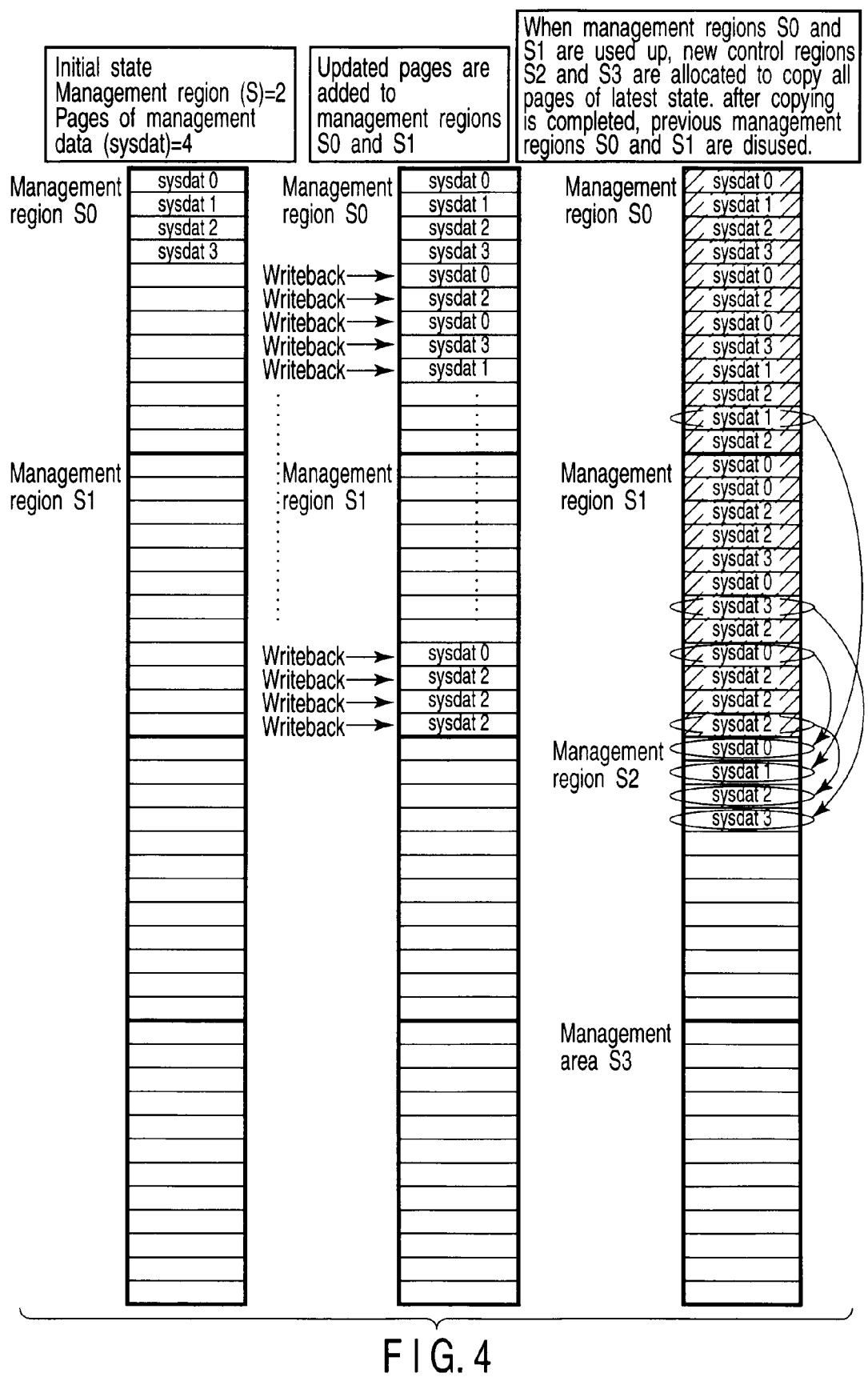
FIG. 4 shows an example of a writeback process performed by a conventional controller.

FIG. 4 shows an example of the writeback process performed by a conventional controller for reference. In the same situation as FIG. 2, two management regions are allocated, and the management data 6 is formed of four pages. Twelve pages can be stored at most in one management region.

The conventional controller adds an updated page into available space of an allocated management region.

When the allocated management region is used up, the controller allocates a new management region, and copies all the pages of the latest state that are included in the management data into the new management region, disusing the previous control block after the copy is finished. In the control operation by the conventional controller, the length of busy time increases as the number of pages that are to be copied from the used-up management region to the newly allocated management region increases.

In contrast to the control operation performed by the conventional controller, the memory control device 2 according to the present embodiment copies, when there is more than one page that is to be copied from a fully occupied management region to the current writeback destination management region, the pages of the latest state in such a manner that the copying operation is divided into a number of times according to occurrence of the writeback process.

Figure 5:
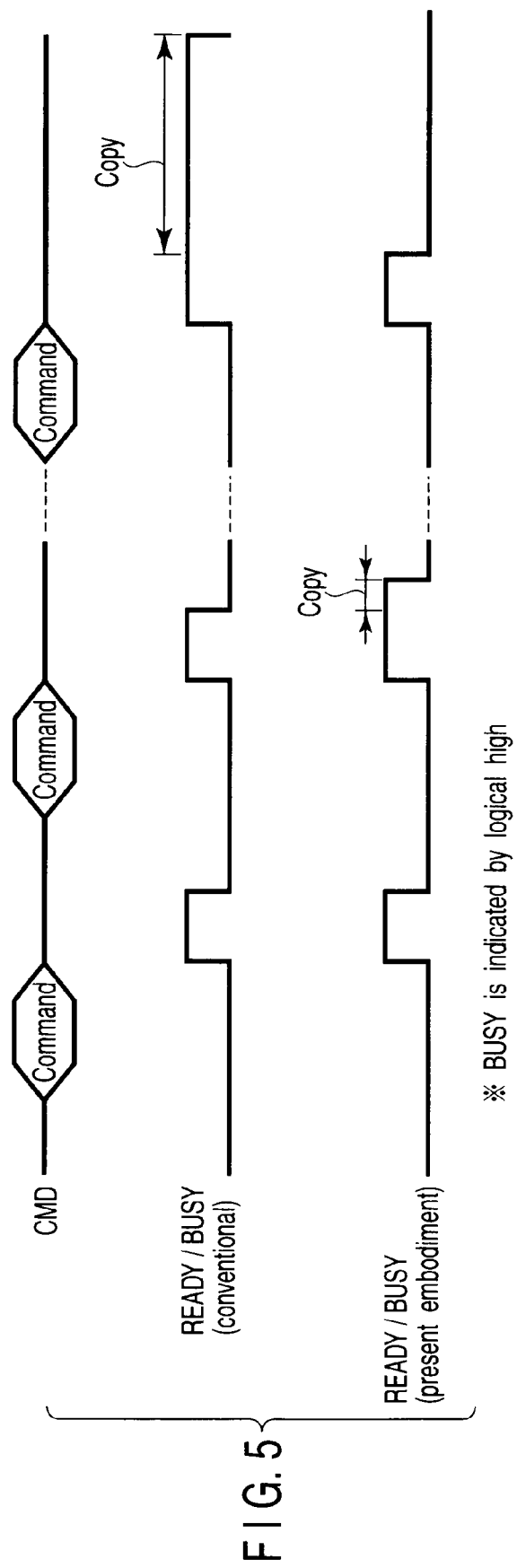
FIG. 5 is a timing chart comparing busy times during the updating processes performed by the conventional controller and by the memory control device according to the embodiment.

FIG. 5 is a timing chart comparing busy times during the updating processes performed by the conventional controller and by the memory control device 2 according to the present embodiment.

In the control by the conventional controller, when a command of updating management data is received from the host, the memory moves from a ready state to a busy state for the writeback process. The busy state of the memory becomes long when a copying operation is carried out onto the new management region.

On the other hand, in the control by the memory control device 2 according to the present embodiment, the copying operation is divided into a number of times when there is more than one page that is to be copied. Thus, a long busy time can be avoided.

Furthermore, in the control by the memory control device 2 according to the present embodiment, the copying operation starts only when the writing to the current management region exceeds a threshold value.

What is claimed is:

1. A memory control device comprising:
   an allocation section allocating a plurality of memory regions of a memory module;
   an available space storage section storing data in available space of a first memory region that is one of the plurality of memory regions and, when no more space becomes available in the first memory region, store data in available space of a second memory region; and
   a copying section copying a plurality of items of to-be-copied data that is stored in the first memory region but not in the second memory region to the second memory region after no more space becomes available in the first memory region in such a manner that a copying operation is divided into a plurality of times,
   wherein when a number of items of data stored in the second memory region exceeds a threshold value that is determined to be 1 or larger and at least one of the items of the to-be-copied data in the first memory region is not yet stored in the second memory region, the copying section copies the to-be-copied data stored in the first memory region to the second memory region each time updated data is stored in the second memory region, and the threshold value is used to determine whether to perform the copying operation each time the updated data is stored in the second memory region.

2. The memory control device according to claim 1, wherein:
   the allocation section releases the first memory region and newly allocates a third memory region when all the to-be-copied data in the first memory region is stored in the second memory region.

3. The memory control device according to claim 2, wherein:
   after the third memory region is allocated, the memory control device performs a copying operation on the second memory region and the third memory region in the same manner as on the first memory region and the second memory region.

4. The memory control device according to claim 1, further comprising:
   a storage section storing data in form of a plurality of pages, wherein the data stored in the first memory region or the second memory region is an updated page from among the plurality of pages stored in the storage section, and the to-be-copied data is a page of a latest state that is stored in the first memory region having no more available space but not in the second memory region having some available space.

5. The memory control device according to claim 4, wherein:

the data is management data that includes data utilized in conversion between a logic address and a physical address.

6. A memory control method, comprising:

allocating a plurality of memory regions of a memory module;

storing data in available space of a first memory region that is one of the plurality of memory regions and, when no more space becomes available in the first memory region, storing data in a second memory region; and copying a plurality of items of to-be-copied data that is stored in the first memory region but not in the second memory region to the second memory region after no more space becomes available in the first memory region, in such a manner that a copying operation is divided into a plurality of times, wherein when a number of items of data stored in the second memory region exceeds a threshold value that is determined to be 1 or larger and at least one of the items of the to-be-copied data in the first memory region is not yet stored in the second memory region, the to-be-copied data stored in the first memory region is copied to the second memory region each time updated data is stored in the second memory region, and the threshold value is used to determine whether to perform the copying operation each time the updated data is stored in the second memory region.

7. The memory control method according to claim 6, further comprising:

releasing the first memory region and newly allocating a third memory region when all the to-be-copied data in the first memory region are stored in the second memory region.

8. The memory control method according to claim 7, further comprising:

performing a copying operation on the second memory region and the third memory region after allocating the third memory region, in the same manner as performing the copying operation on the first memory region and the second memory region.

9. The memory control method according to claim 6, wherein:

the data stored in the first memory region or the second memory region is an updated page from among the plurality of pages, and the to-be-copied data is a page of a latest state that is stored in the first memory region having no more available space but not in the second memory region having some available space.

10. The memory control method according to claim 9, wherein:

the plurality of pages are management data that includes data utilized in conversion between a logic address and a physical address.

11. A storage device, comprising:

a memory controller; and a memory module, wherein the memory controller comprises:

an allocation section allocating a plurality of memory regions of a memory module;

an available space storage section storing data in available space of a first memory region that is one of the plurality of memory regions and, when no more space becomes available in the first memory region, store data in a second memory region; and a copying section copying a plurality of items of to-be-copied data that is stored in the first memory region but not in the second memory region to the second memory region after no more space becomes available in the first memory region in such a manner that a copying operation is divided into a plurality of times, and wherein when a number of items of data stored in the second memory region exceeds a threshold value that is determined to be 1 or larger and at least one of the items of the to-be-copied data in the first memory region is not yet stored in the second memory region, the copying section copies the to-be-copied data stored in the first memory region to the second memory region each time updated data is stored in the second memory region, and the threshold value is used to the second memory region, and the threshold value is used to determine whether to perform the copying operation each time the updated data is stored in the second memory region.

12. The storage device according to claim 11, wherein:

the allocation section releases the first memory region and newly allocates a third memory region when all the to-be-copied data in the first memory region is stored in the second memory region.

13. The storage device according to claim 12, wherein:

after the third memory region is allocated, the memory control device performs a copying operation on the second memory region and the third memory region in the same manner as on the first memory region and the second memory region.

14. The memory control device according to claim 11, wherein the memory controller further comprising a storage section storing data in form of a plurality of pages, wherein the data stored in the first memory region or the second memory region is an updated page from among the plurality of pages stored in the storage section, and the to-be-copied data is a page of a latest state that is stored in the first memory region having no more available space but not in the second memory region having some available space.

* * * * *